(12) United States Patent
Lin

(10) Patent No.: US 8,039,985 B2
(45) Date of Patent: Oct. 18, 2011

(54) WIND TURBINE

(76) Inventor: Cheng-Te Lin, Hsinchu (TW)

( * ) Notice: Subject to any disclaimer, the term of this patent is extended or adjusted under 35 U.S.C. 154(b) by 323 days.

(21) Appl. No.: 12/493,487

(22) Filed: Jun. 29, 2009

(65) Prior Publication Data

US 2010/0327598 A1 Dec. 30, 2010

(51) Int. Cl.
*F03D 9/00* (2006.01)
(52) U.S. Cl. ............................................ 290/55
(58) Field of Classification Search .............. 290/55
See application file for complete search history.

(56) References Cited

U.S. PATENT DOCUMENTS

| | | | |
|---|---|---|---|
| 7,780,320 B2 * | 8/2010 | Hu et al. | 362/431 |
| 2008/0272603 A1 * | 11/2008 | Baca et al. | 290/55 |
| 2010/0230973 A1 * | 9/2010 | Ortiz et al. | 290/55 |

FOREIGN PATENT DOCUMENTS

| | | | |
|---|---|---|---|
| CN | 201187414 Y | * | 1/2009 |
| CN | 201225723 Y | * | 4/2009 |
| CN | 102011704 A | * | 4/2011 |
| SU | 1236182 A | * | 6/1986 |
| TW | 200839092 A | * | 10/2008 |

* cited by examiner

*Primary Examiner* — Joseph Waks
(74) *Attorney, Agent, or Firm* — C. G. Mersereau; Nikolai & Mersereau, P.A.

(57) ABSTRACT

A wind turbine has a housing, multiple cross-flow fan assemblies, a turbine generator assembly, an air guide and multiple wind-driven fans. The housing has a chamber having top and bottom openings. The cross-flow fan assemblies are mounted on the housing and each has a casing, a cross-flow fan blade and a transmission shaft. The cross-fan blade rotates to provide airflow to the chamber. The turbine generator assembly is mounted in the chamber and has a generator, a generator shaft mounted on the generator and a turbine blade mounted on the generator shaft and driven by the airflow to activate the generator. The air guide is mounted on the transmission shafts and guides airflow outwards. The wind-driven fans are mounted respectively on the transmission shafts and are driven by outward airflow. The wind turbine derives energy from the airflow exiting out of the wind turbine for improved energy extraction efficiency.

14 Claims, 10 Drawing Sheets

WIND TURBINE

BACKGROUND OF THE INVENTION

1. Field of the Invention

The present invention relates to a turbine, and more particularly to a wind turbine that transfers external airflow to improve power generating efficiency.

2. Description of Related Art

Conventional wind power generators such as windmills and wind turbines have a generator and rotor. The rotor is connected to the generator and has cross-flow fan blades so that airflow over the cross-flow fan blades rotates the rotor and drives the generator.

However, the conventional wind power generators cannot utilize slow moving output airflow to fully derive kinetic energy therefrom.

However, conventional wind turbines are customized to remove a percentage of energy from the airflow according to average annual wind speeds. Therefore, during relative light wind, the wind turbine may not turn, or may turn too slowly to generate power and during high relative wind speeds, the airflow passes the wind turbine, but only transfers a relatively low amount of energy. Therefore, operating efficiency and annual generation time of the wind turbine is reduced.

To overcome the shortcomings, the present invention provides a wind turbine to mitigate or obviate the aforementioned problems.

SUMMARY OF THE INVENTION

The main objective of the invention is to provide a wind turbine that transfers slow output airflow for improved power generating efficiency.

A wind turbine in accordance with the present invention has a housing, multiple cross-flow fan assemblies, a turbine generator assembly, an air guide and multiple wind-driven fans. The housing has a chamber having top and bottom openings. The cross-flow fan assemblies are mounted on the housing and each has a casing, a cross-flow fan blade and a transmission shaft. The cross-fan blade rotates to pull airflow through the chamber. The turbine generator assembly is mounted in the chamber and has a generator, a generator shaft mounted on the generator and a turbine blade mounted on the generator shaft. Airflow drives the generator to produce electricity. The air guide is mounted on the transmission shafts and guides airflow outwards. The wind-driven fans are mounted on the transmission shaft and are driven by the outward airflow. Therefore, the wind turbine derives energy from the airflow exiting out of the wind turbine for improved energy extraction efficiency.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
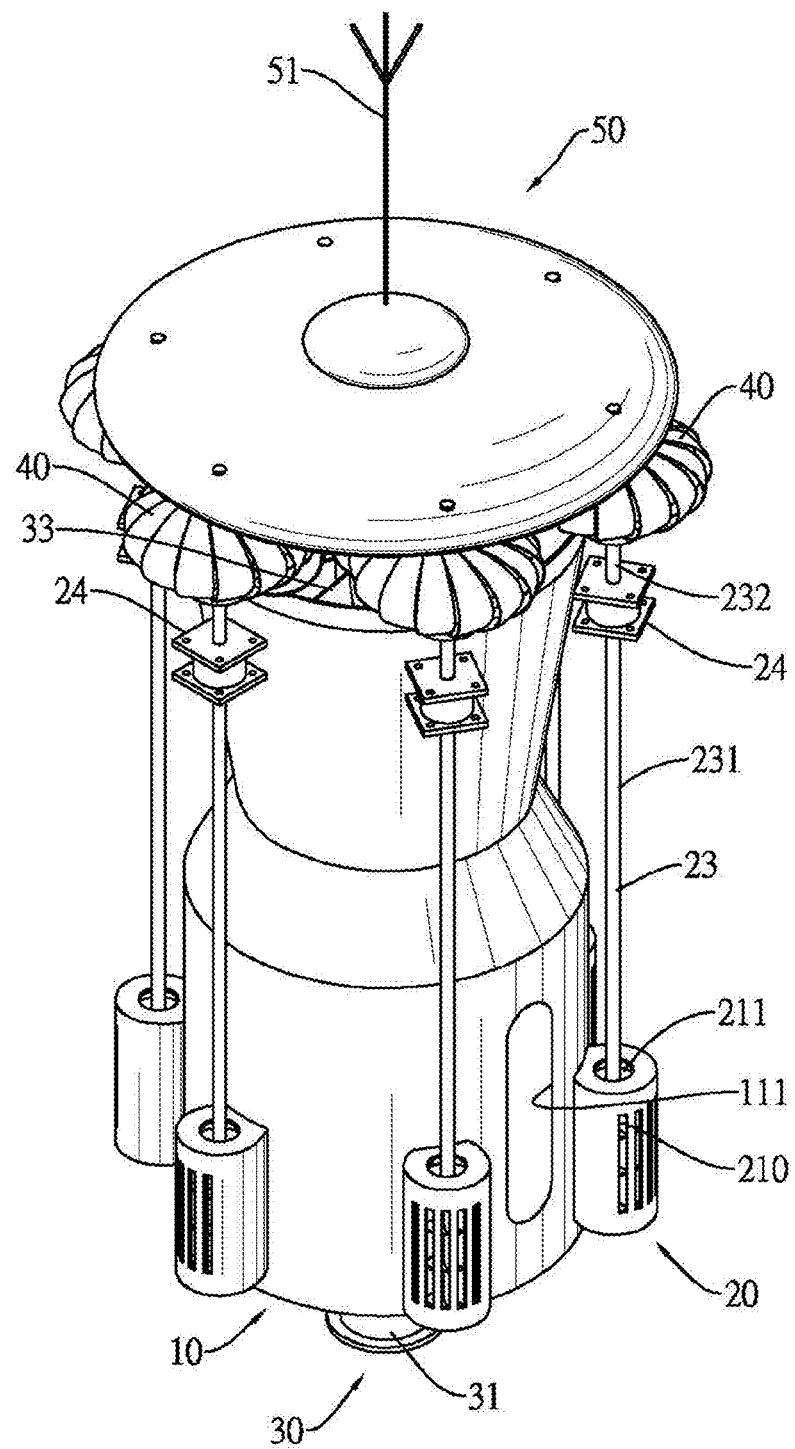
FIG. 1 is a perspective view of a wind turbine in accordance with the present invention.
Figure 2:
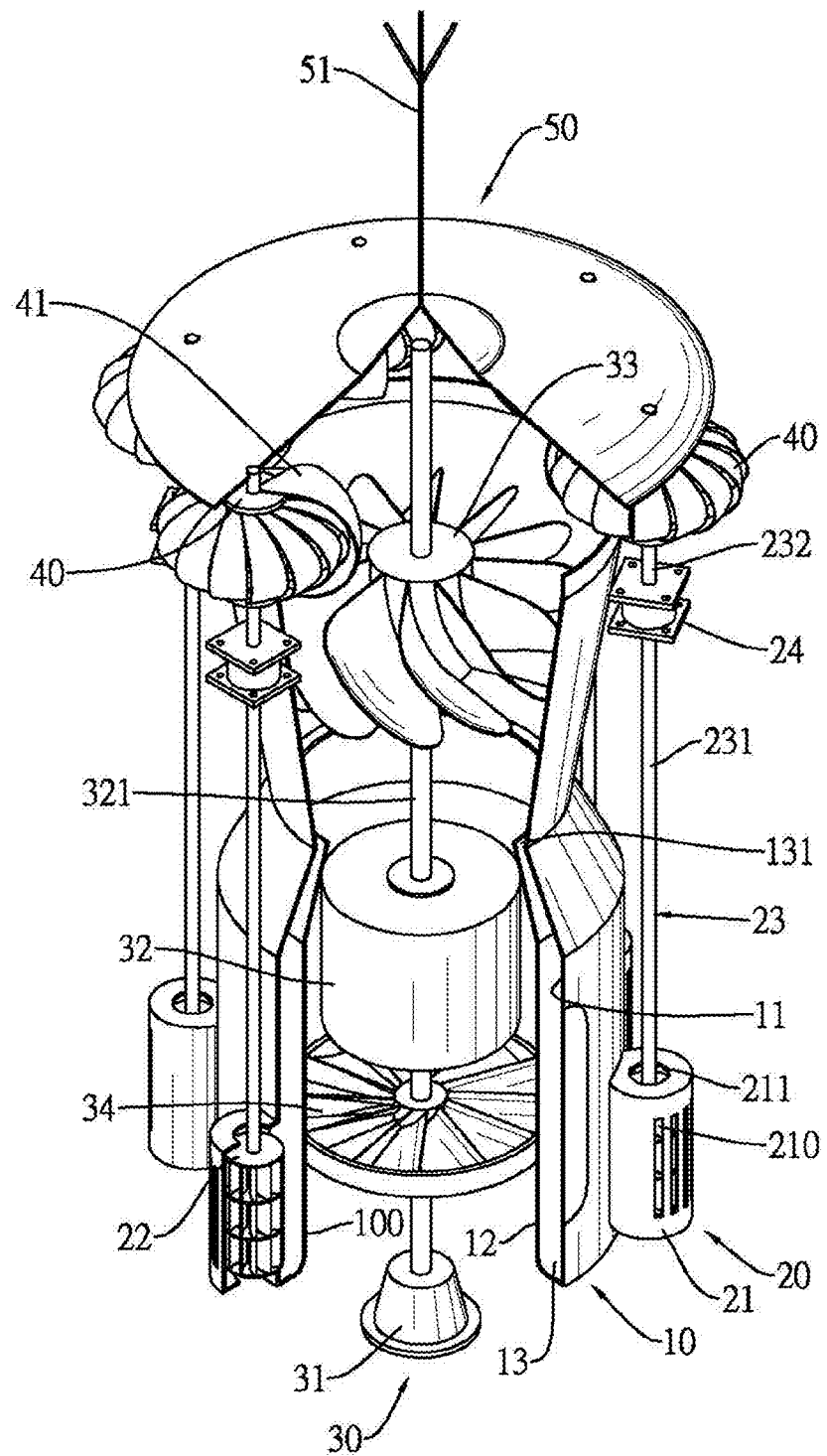
FIG. 2 is a perspective view in partial section of the wind turbine in FIG. 1.
Figure 3:
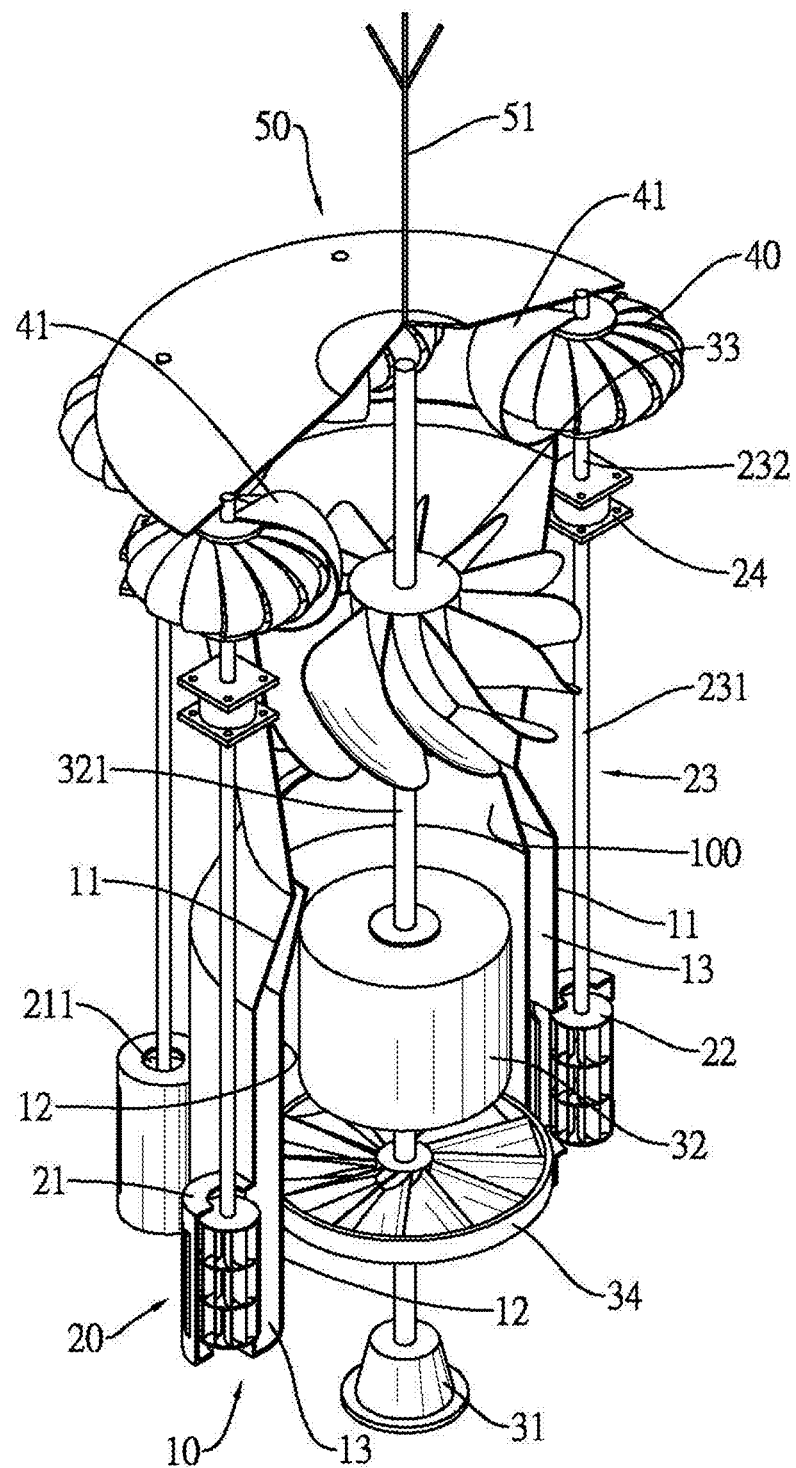
FIG. 3 is another perspective view in partial section of the wind turbine in FIG. 1.

With reference to FIGS. 1 to 3, a wind turbine in accordance with the present invention comprises a housing (10), multiple cross-flow fan assemblies (20), a turbine generator assembly (30), an air guide (50) and multiple wind-driven fans (40).

Figure 4:
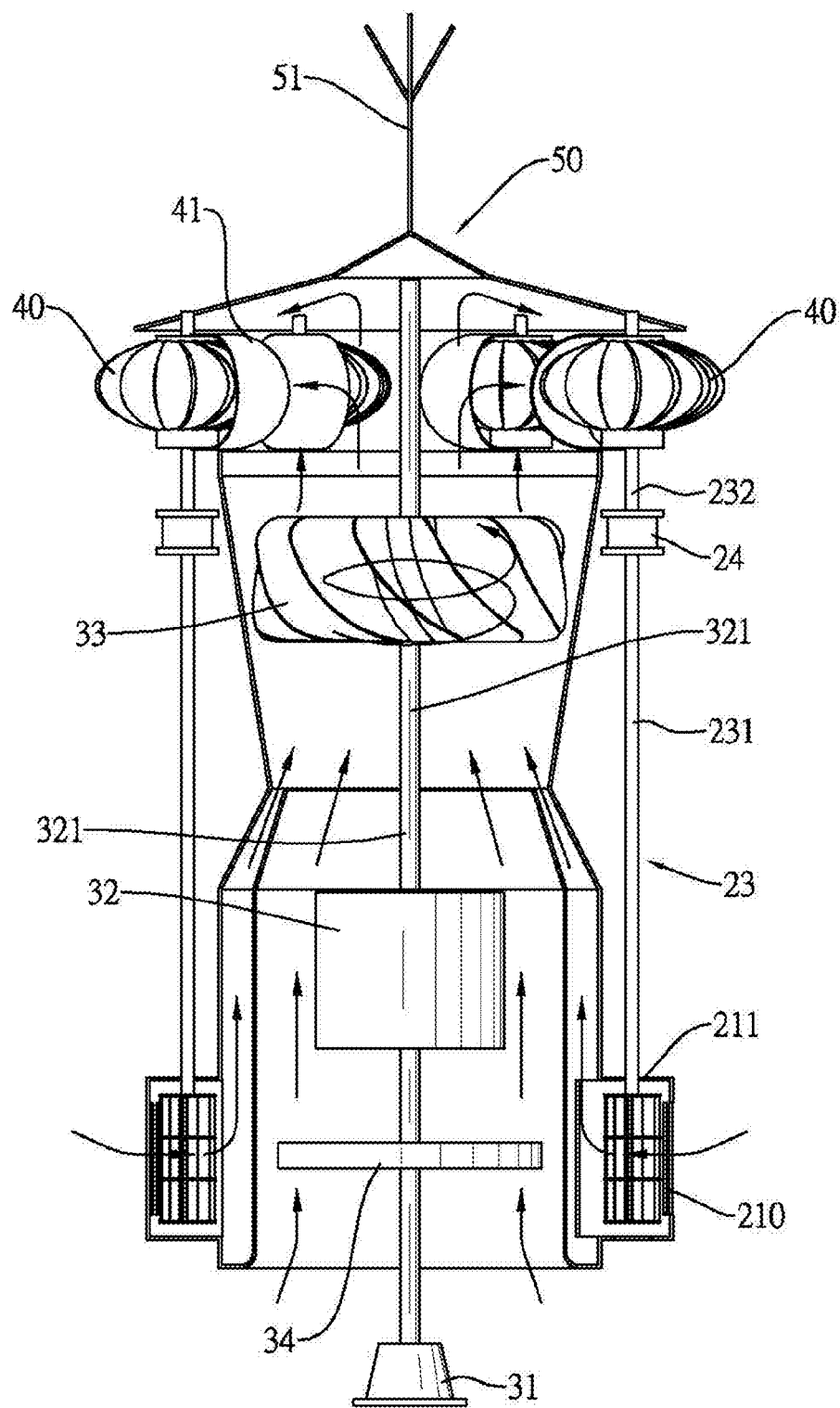
FIG. 4 is a side view in partial section of the wind turbine in FIG. 1.

With further reference to FIG. 4, the housing (10) has a chamber (100) and may further have an inner sidewall (12), an outer sidewall (11), a channel (13) and an entrance (111).

The chamber (100) is defined in the housing (10) and has a top opening and a bottom opening.

The inner sidewall (12) is annular, is formed on the housing (10) and surrounds the chamber (100).

The outer sidewall (11) is annular, is formed on the housing (10), surrounds the inner sidewall (12) and may be higher than the inner sidewall (12).

The channel (13) is annular, is defined between the inner sidewall (12) and the outer sidewall (11) and communicates with the chamber (100).

The entrance (111) is defined through the inner and outer sidewalls (12, 11) of the housing (10) and allows access to the channel (13) or chamber (100) for examination and maintenance.

Figure 5:
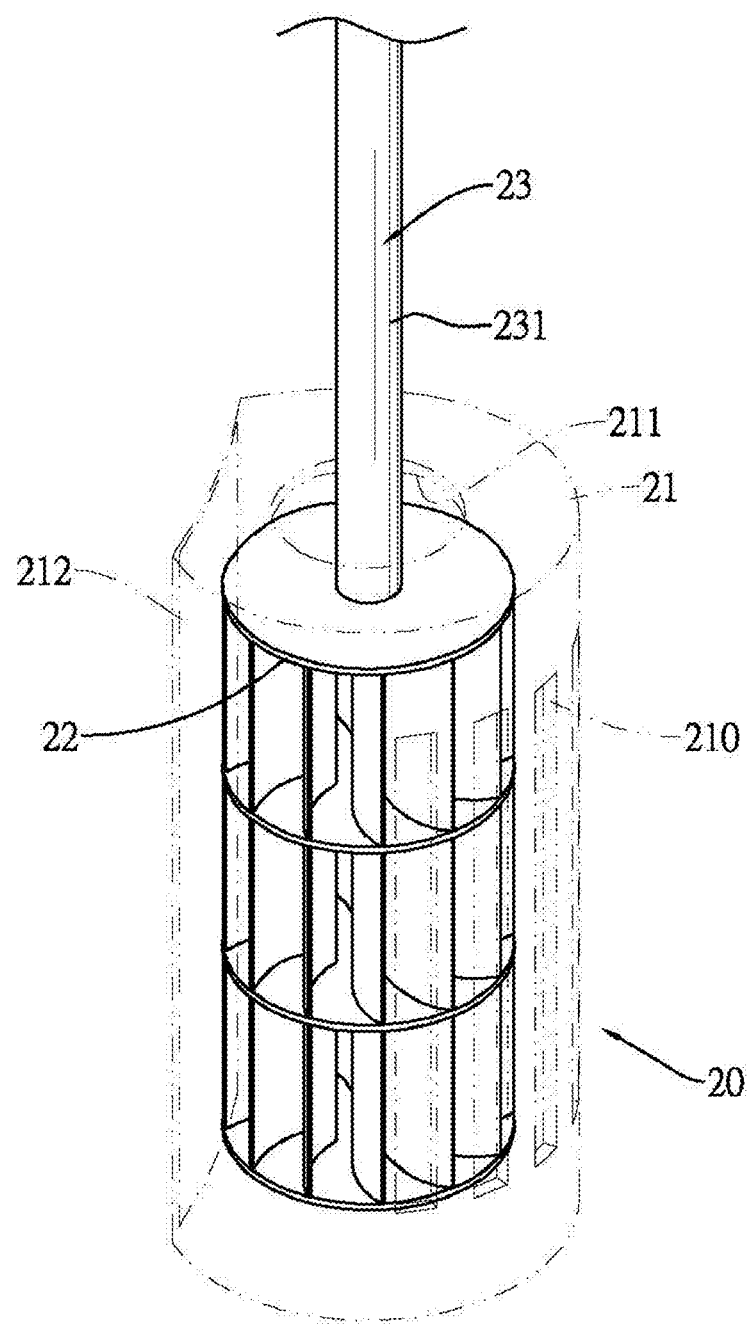
FIG. 5 is an enlarged perspective view of a cross-flow fan of the wind turbine in FIG. 1.

With further reference to FIG. 5, the cross-flow fan assemblies (20) are mounted on and exposed out of the housing (10) and communicate with the chamber (100) and the channel (13). Each cross-flow fan assembly (20) has a casing (21), a cross-flow fan blade (22) and a transmission shaft (23).

The casing (21) is hollow, is mounted on the housing (10), may be mounted on the outer sidewall (11) of the housing (10) and communicates with the chamber (100) and the channel (13). The casing (21) has a top, an outer surface, at least one inlet hole (210) and at least one outlet hole (212) and may further have an axial inlet hole (211). The at least one inlet hole (210) may be at least one radial inlet hole and is defined through the outer surface of the casing (21). The at least one outlet hole (212) is defined through the outer surface of the casing (21). The axial inlet hole (211) is defined through the top of the casing (21).

The cross-flow fan blade (22) is mounted rotatably in the casing (21) and may rotate to suck air from the at least one radial inlet hole (210) and the axial inlet hole (211) and generate airflow out of the at least one outlet hole (212) into the channel (13) and the chamber (100). Furthermore, external wind blowing into at least one radial inlet hole also rotates the cross-flow fan blade (22).

Figure 6:
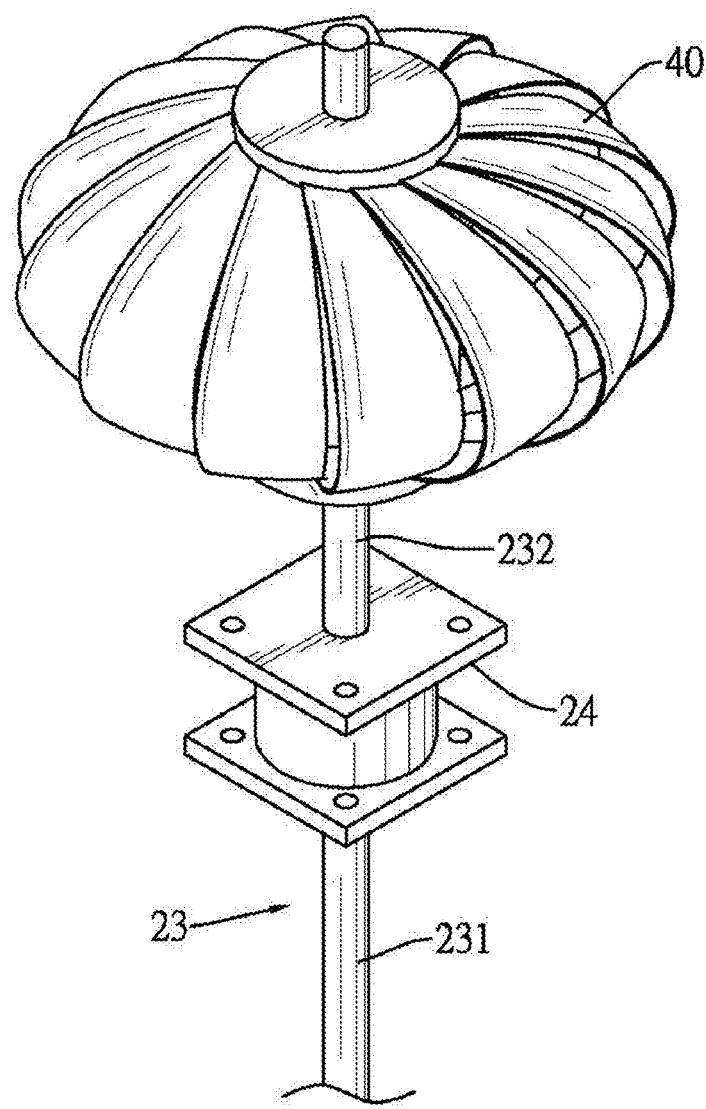
FIG. 6 is an enlarged perspective view of a wind-driven fan and a transmission of the wind turbine in FIG. 1.

With further reference to FIG. 6, the transmission shaft (23) is mounted on and protrudes axially from the cross-flow fan blade (22) out of axial inlet hole (211) of the casing (21) and may be mounted securely on the outer sidewall (11) of the housing (10). The transmission shaft (24) has a top end, a bottom end and may have a lower section (231), an upper section (232) and a transmission (24). The bottom end is mounted on the cross-fan blade (22). The lower section (231) is mounted on the cross-fan blade (22). The transmission (24) is connected between the lower and upper sections (231, 232) and has gears to make the lower and upper sections (231, 232) rotate at different rotational speeds when the transmission shaft (23) is operating. Preferably, the transmission (24) is an accelerator making the rotational speed of the lower section (232) higher than that of the upper section (231) when the transmission shaft (23) rotates.

Figure 9:
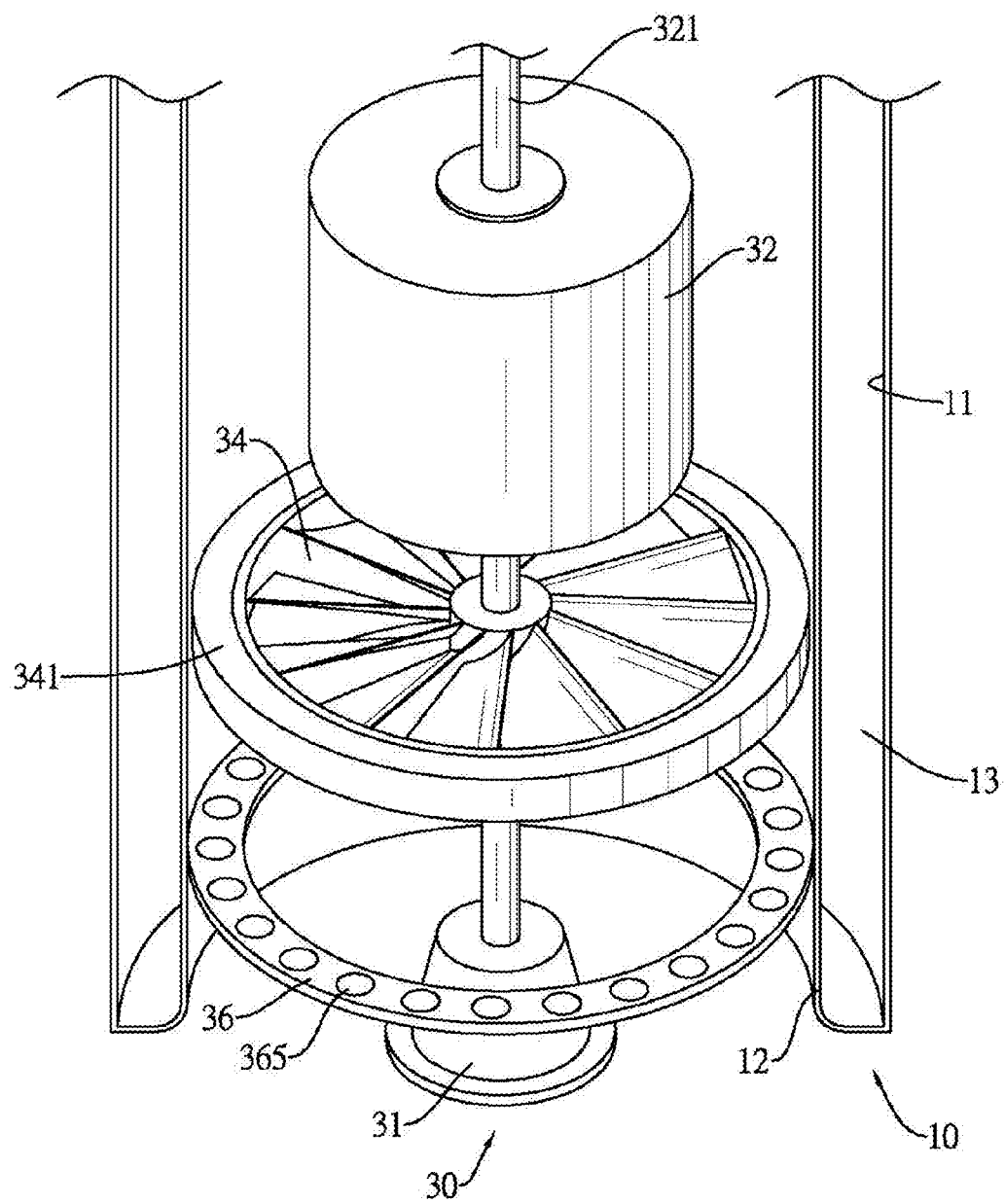
FIG. 9 is an enlarged perspective view of internal elements of the wind turbine in FIG. 1 further having a magnetic assembly.
Figure 10:
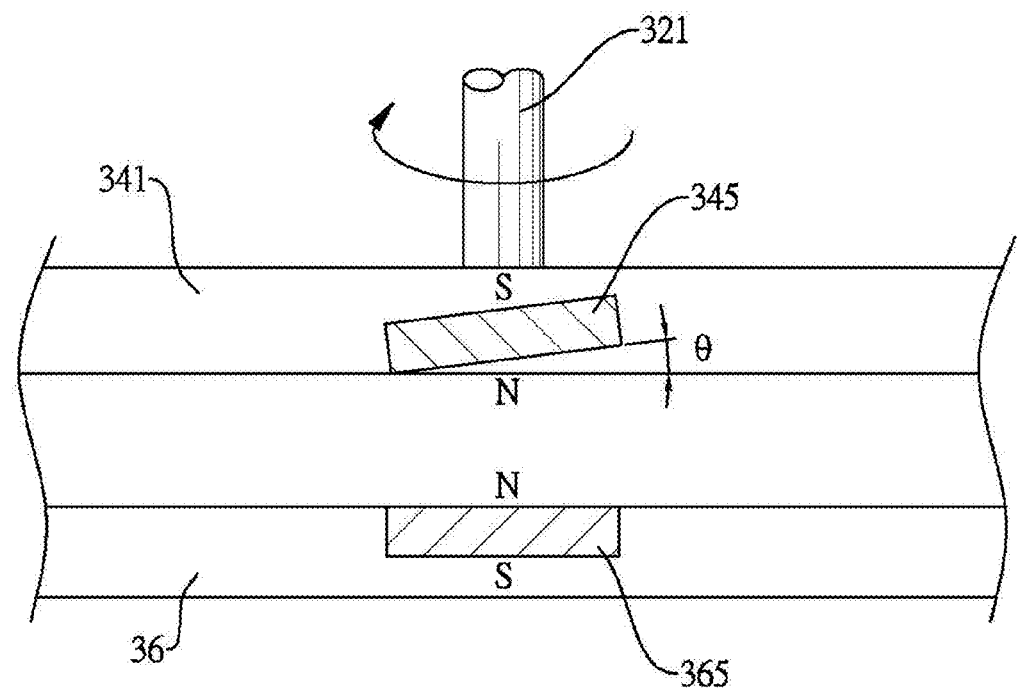
FIG. 10 is a side view in partial section of the wind turbine in FIG. 9 showing movable and stationary magnets.

With further reference to FIGS. 9 and 10, the turbine generator assembly (30) is mounted in the chamber (100) of the housing (10) and has a generator (32) and a turbine blade (33) and may further have a base (31), an axial fan (34) and a magnetic assembly.

The generator (32) is mounted securely in the chamber (100) of the housing (10) and has a generator shaft (321) mounted rotatably through the generator (32) and having a top end and a bottom end.

The turbine blade (33) is mounted securely around the generator shaft (321) in the chamber (100) over the channel (13) and may be driven and rotated by airflow from the channel (13) and bottom opening of the chamber (100) to turn the generator (32).

The base (31) is connected to the bottom end of the generator shaft (321) and is located under the housing (10) and may be set on the ground or a building.

The axial fan (34) is mounted securely around the generator shaft (321) near the bottom opening of the chamber (100) and may be driven and rotated by airflow from the bottom opening of the chamber (100) to turn the generator (32).

The magnetic assembly, as shown in FIGS. 9 and 10, is mounted in the chamber (100) of the housing (10) and has a movable loop (341) and a stationary loop (36).

The movable loop (341) may be made of magnetically insulating material, is mounted around the axial fan (34) on a level perpendicular to the generator shaft (321) and has multiple movable magnets (345) embedded in the movable loop (341) and arranged circularly. Each movable magnet (345) has an inclined axis and two magnetic poles (S, N). The inclined axis is oblique to the level by an included angle ($\theta$). The included angle ($\theta$) may be from 5 to 9 degrees. The magnetic poles (S, N) are arranged along the inclined axis.

The stationary loop (36) may be made of magnetically insulating material, is mounted securely in the chamber (100) of the housing (10) parallel to the movable loop (341) and has multiple stationary magnets (365) embedded in the stationary loop (341), arranged circularly and disposed to repel the movable magnets (345). Each stationary magnet (365) has two magnetic poles (S, N) disposed parallel to the generator shaft (321) so that the stationary magnets (365) are oblique to the movable magnets (345) and drive the movable loop (341) and the axial fan (34) to rotate. Therefore, the magnetic assembly facilitates rotation of the generator shaft (321) and turning of the generator (32).

The air guide (50) may be conical, is mounted securely on top ends of the transmission shafts (23), guides upward airflow from the chamber (100) of housing (10) to transversely flow outwards and may have a lightning conductor (51). The lightning conductor (51) is mounted on the air guide (50) to prevent the lightning strikes from damaging the generator (32) or other components of the wind turbine.

The wind-driven fans (40) are securely mounted respectively around and correspond to the top ends of the transmission shafts (23), are located adjacent to the top opening of the chamber (100) of the housing (10) under the air guide (50) and are primarily driven by external wind force to rotate the transmission shafts (23) and cross-flow fan blades (22) to input airflow into the channel (13) of the housing (10). The wind-driven fans (40) are also driven by airflow guided by the air guide (50), as shown in FIG. 4. The wind-driven fans (40) may be securely mounted respectively on the upper sections (232).

Figure 7:
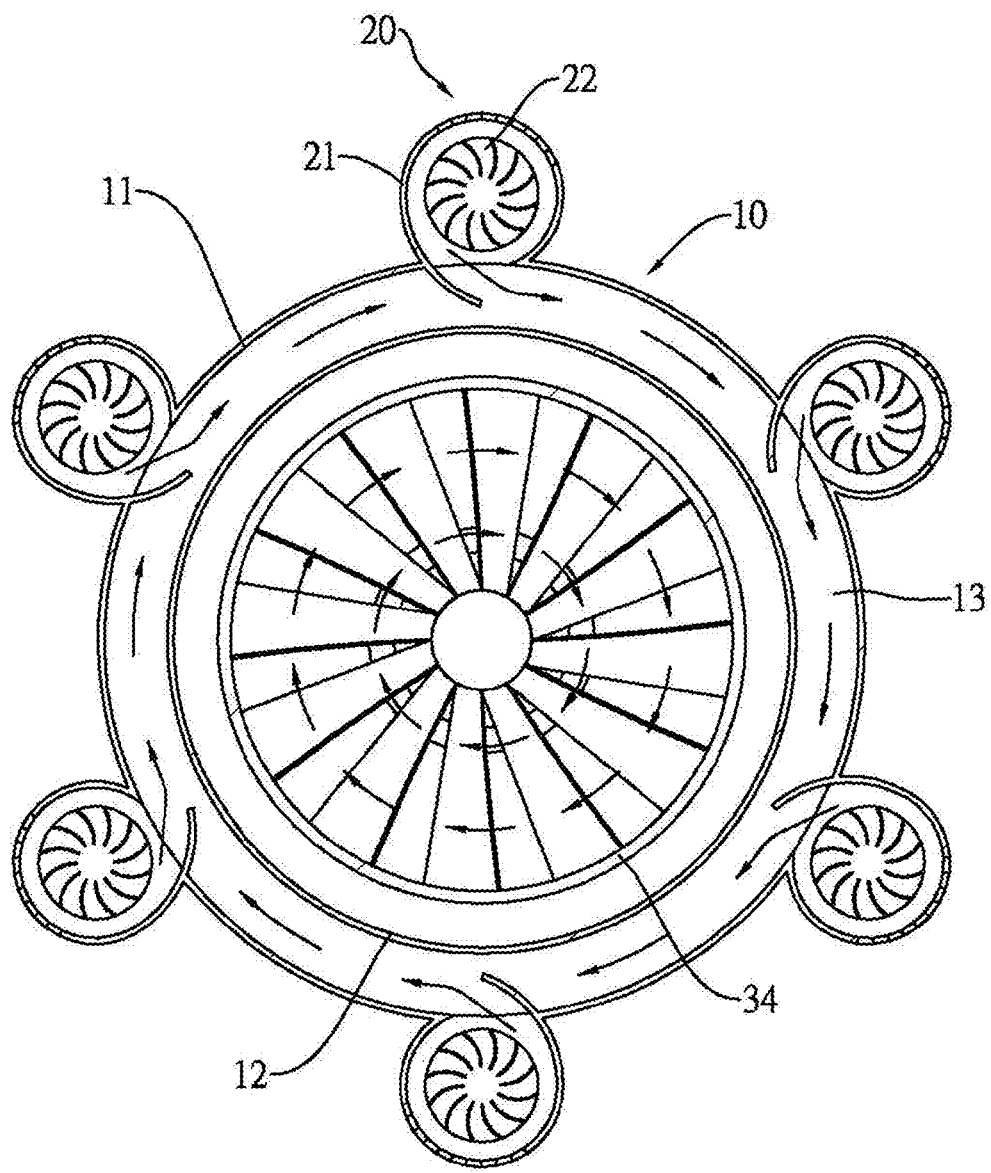
FIG. 7 is a cross sectional top view of the wind turbine in FIG. 1.
Figure 8:
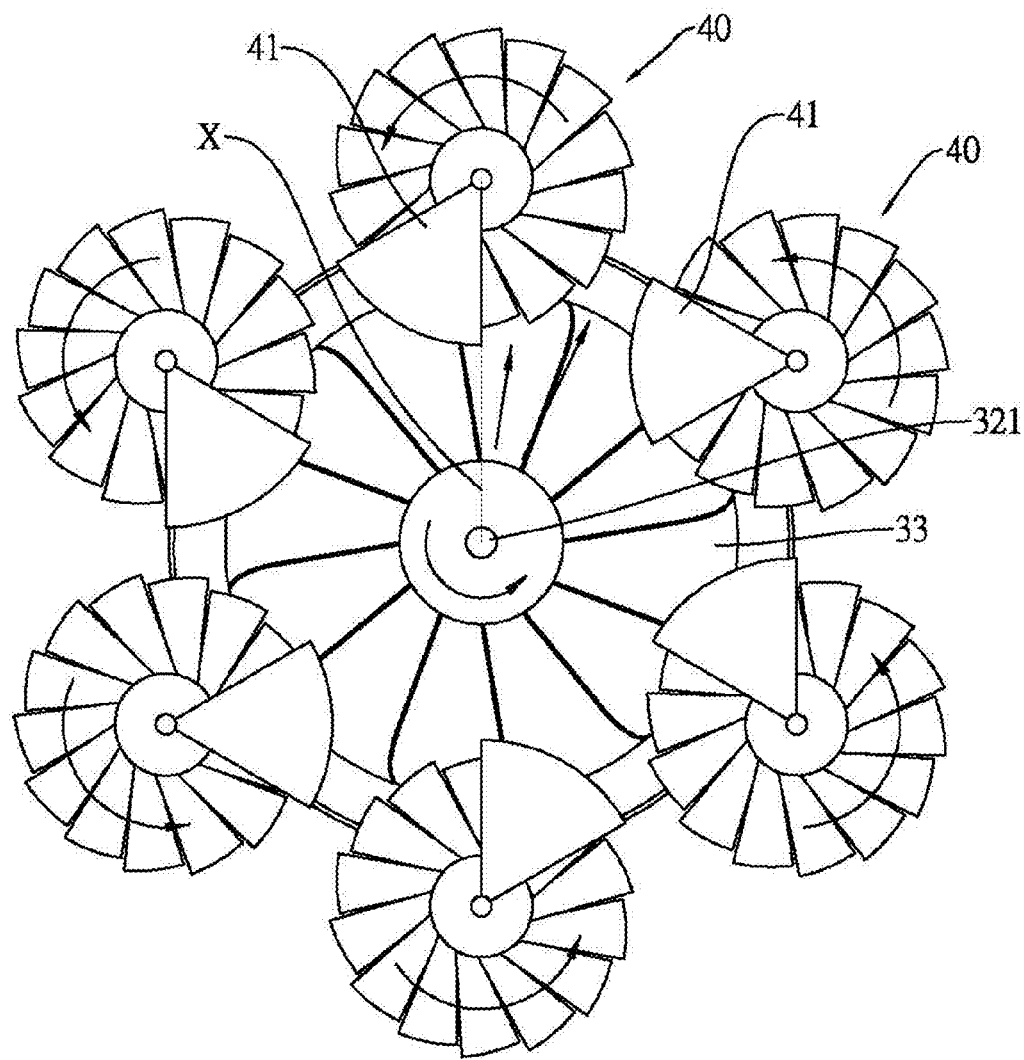
FIG. 8 is a top view of the wind turbine in FIG. 1 without showing the air guide.

With further reference to FIG. 8, each wind-driven fan (40) may have two disk mounts, multiple blade elements and a baffle (41). The baffle (41) is U-shaped, is mounted on and partially covers the wind-driven fan (40) may have a luff edge and a leech edge and may partially cover the first half of the wind-driven fan (40). The luff edge of the baffle (41) may be disposed along a line (X) extending along a corresponding radius from the generator shaft (321) to a corresponding transmission shaft (23). Thus, the baffles (41) ensure the wind-driven fans (40) rotate in a same desired rotational direction. Thus, energy from low speed airflow exiting out of the turbine generator assembly (30) is transferred through the cross-flow fan assemblies (20) to generate high speed airflow for use by the wind turbine. With further reference to FIGS. 4 to 7, when the wind turbine operates, external wind force blows the wind-driven fans (40) to rotate the cross-flow fan blades (22) so that airflow is input into the channel (13) and the chamber (100). The airflow in the chamber (100) forms a cyclone revolving and moving upwards through the air guide (50) and sucking additional air from the bottom opening of the chamber (100), as shown in FIGS. 4 and 7. The upward airflow rotates the turbine blade (33) and generator shaft (321) to activate the generator (32), which first uses the airflow to generate power. Furthermore, the air guide (50) guides the upward airflow outward to blow the wind-driven fans (40) so that the wind-driven fans (40) use the airflow for generating power.

The wind turbine transfers airflow to the chamber (100) and efficiently rotates the generator shaft (321). Thus, the wind turbine may steadily operate and generate under light winds.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A wind turbine comprising:
  a housing having a chamber defined in the housing and having a top opening and a bottom opening;
  multiple cross-flow fan assemblies mounted on the housing, communicating with the chamber and each cross-flow fan assembly having
    a casing being hollow, mounted on the housing and communicating with the chamber and having
      at least one inlet hole defined through the casing; and
      at least one outlet hole defined through the casing and communicating with the chamber;
    a cross-flow fan blade mounted rotatably in the casing and selectively providing airflow to the chamber; and
    a transmission shaft mounted on and protruding axially from the cross-flow fan blade and having a top end and a bottom end;
  a turbine generator assembly mounted in the chamber of the housing and having a generator mounted securely in the chamber of the housing and having a generator shaft mounted rotatably through the generator and having a top end and a bottom end; and a turbine blade mounted securely around the generator shaft in the chamber and selectively driven and rotated by the airflow from the chamber to drive the generator;

an air guide mounted securely on top ends of the transmission shafts and selectively guiding the airflow from the chamber of the housing to transversely flow outwards; and multiple wind-driven fans securely mounted respectively around and corresponding to the transmission shafts, located adjacent to the top opening of the chamber of the housing under the air guide and driven by the airflow guided by the air guide.

2. The wind turbine as claimed in claim 1, wherein the housing further has an inner sidewall being annular, formed on the housing and surrounding the chamber;

an outer sidewall being annular, formed on the housing, higher than and surrounding the inner sidewall; and a channel being annular, defined between the inner and outer sidewalls and communicating with the chamber.

3. The wind turbine as claimed in claim 2, wherein the housing further has an entrance defined through the outer and inner sidewalls of the housing.

4. The wind turbine as claimed in claim 1, wherein the turbine generator assembly further has a base connected to the bottom end of the generator shaft and located under the housing.

5. The wind turbine as claimed in claim 1, wherein the turbine generator assembly further has an axial fan mounted securely around the generator shaft near the bottom opening of the chamber.

6. The wind turbine as claimed in claim 5, wherein the turbine generator assembly further has a magnetic assembly mounted in the chamber of the housing and having a movable loop mounted around the axial fan on a level perpendicular to the generator shaft and having multiple movable magnets embedded in the movable loop and each movable magnetic being inclined to the level; and a stationary loop mounted securely in the chamber of the housing, being parallel to the movable loop and having multiple stationary magnets embedded in the stationary loop, disposed to repel the movable magnets and each stationary magnet disposed perpendicularly to the level so that the stationary magnets are oblique to the movable magnets and drive the movable loop and the axial fan to rotate.

7. The wind turbine as claimed in claim 6, wherein an included angle between an inclined axis of each movable magnet and the level of the movable loop is from 5 to 9 degrees.

8. The wind turbine as claimed in claim 1, wherein each wind-driven fan further has a baffle being U-shaped, mounted on and partially covering the wind-driven fan to guide the airflow to blow the wind-driven fans to rotate in a same rotational direction.

9. The wind turbine as claimed in claim 8, wherein the baffle of each wind-driven fan has a luff edge and a leeching edge and, the luff edge of the baffle is disposed along a line extending along a corresponding radius from the generator shaft to a corresponding transmission shaft.

10. The wind turbine as claimed in claim 1, wherein the transmission shaft of each cross-flow fan assembly further has a lower section mounted on the cross-fan blade;

an upper section; and a transmission connected between the lower and upper sections to accelerate a rotational speed of the lower section higher than that of the upper section when the transmission shaft rotates.

11. The wind turbine as claimed in claim 1, wherein the casing of each cross-flow fan assembly further has a top and an outer surface; and in each casing, the at least one radial inlet hole and the at least one outlet hole are defined through the outer surface.

12. The wind turbine as claimed in claim 11, wherein the casing of each cross-flow fan assembly further has an axial inlet hole defined through the top.

13. The wind turbine as claimed in claim 1, wherein the air guide is conical.

14. The wind turbine as claimed in claim 1, wherein the air guide further has a lightning conductor mounted on the air guide.

* * * * *